INVENTORS
PATRICK E. LANNAN,
GEORGE J. PRUSHA,
RICHARD P. PRICE,
BY Justin W. Macklin
ATTY INVENTORS
PATRICK E. LANNAN,
GEORGE J. PRUSHA,
RICHARD P. PRICE,
BY Justin W. Macklin
ATTY

United States Patent Office 3,049,598
Patented Aug. 14, 1962

3,049,598
PROGRAM TIMING DEVICE
Patrick E. Lannan, George J. Prusha, and Richard P. Price, all of Parma Heights, Ohio, assignors, by mesne assignments, to International Resistance Company, Philadelphia, Pa., a corporation of Delaware
Filed Sept. 19, 1958, Ser. No. 763,774
13 Claims. (Cl. 200—46)

This invention relates in general to a program timer, and particularly to a program timer which is rugged, light in weight, and very accurate and of a type which is suitable for timing the program of operation in a rocket device such as a launching mechanism for an earth satellite.

The successful launching of an earth satellite into a predetermined orbit requires that the launching vehicle be at the right height, traveling at the right velocity, and in the right attitude at the instant of orbital launch. To insure that these conditions are met, it is necessary to control the time of operation of the propulsion systems and steering systems very accurately, and the device which functions to time the program of the operations in the various systems in the rocket is called a "program timer."

A timing device of the type under consideration here must be capable of operating through a wide temperature range, e.g., from 0° to 120° F., and must also be capable of operating accurately over a wide range of pressures, e.g., from 2–22 pounds per square inch. It must have a weight which is kept at a minimum because of the very nature of vehicle which is to carry the device; it must be very rugged so that vibrations which occur at any frequency or amplitude or direction will not affect the accuracy of the device; and above all, it must provide an accurate timing of the planned program over a relatively long period of time, which may be several hundred seconds. It is generally required that the accuracy of the timing operation be within a fraction of one second.

It is an object of the present invention to provide an improved program timer of the general type under consideration here.

It is another object of the present invention to provide a very accurate program timer which is light in weight and rugged in construction.

It is a specific object of the invention to provide a program timer which will time many different independent operations with a high degree of accuracy over a relatively long period of time.

In accordance with the invention, the program timing device comprises a self-winding tape having stored thereon program governing means, for convenient designation herein termed timing "information." In a particular embodiment of the invention, this self-winding tape is a thin metal strip and which has the program timing information or signal impulse actuating means carried thereby, preferably in the form of punched holes in the tape. A motor is provided for driving the tape at precise predetermined speed.

In a preferred embodiment of the invention, the means for deriving the program information, that is, for controlling signal impulses effecting the required timing functions, according to the program, are preferably a plurality of micro-switches arranged to be actuated by holes in the tape, and which in turn operate relays at the predetermined times. These relays may be conveniently grouped in a zone extending transversely of the tape, and means for driving the tape and for maintaining it in constant tension during its programming operation may include a pair of rotating driving and tape guiding means, spaced longitudinally of the tape and positioned at opposite sides of the zone of microswitches. Both of said driving means are coupled to the drive motor and the tape driving members preferably engage the tape with positive mechanical engaging elements in the form of sprocket wheels with teeth projecting into uniformly spaced holes arranged at the marginal edges of the tape. These driving means are so interconnected that the mechanical engagement with the tape may effect the maintaining of tension thereon while the tape is running in one direction and in engagement therewith, and while the tape is fed freely from a coiled position and winds itself into another coiled position independently of the precisely controlled tension maintaining and driving means.

For a better understanding of the present invention together with other and further objects thereof, reference is had to the following description taken in connection with the accompanying drawings, and its scope will be pointed out in the appended claims:

FIG. 1 of the drawings is a partially exploded view of a program timing device in accordance with the invention;

Figure 1:
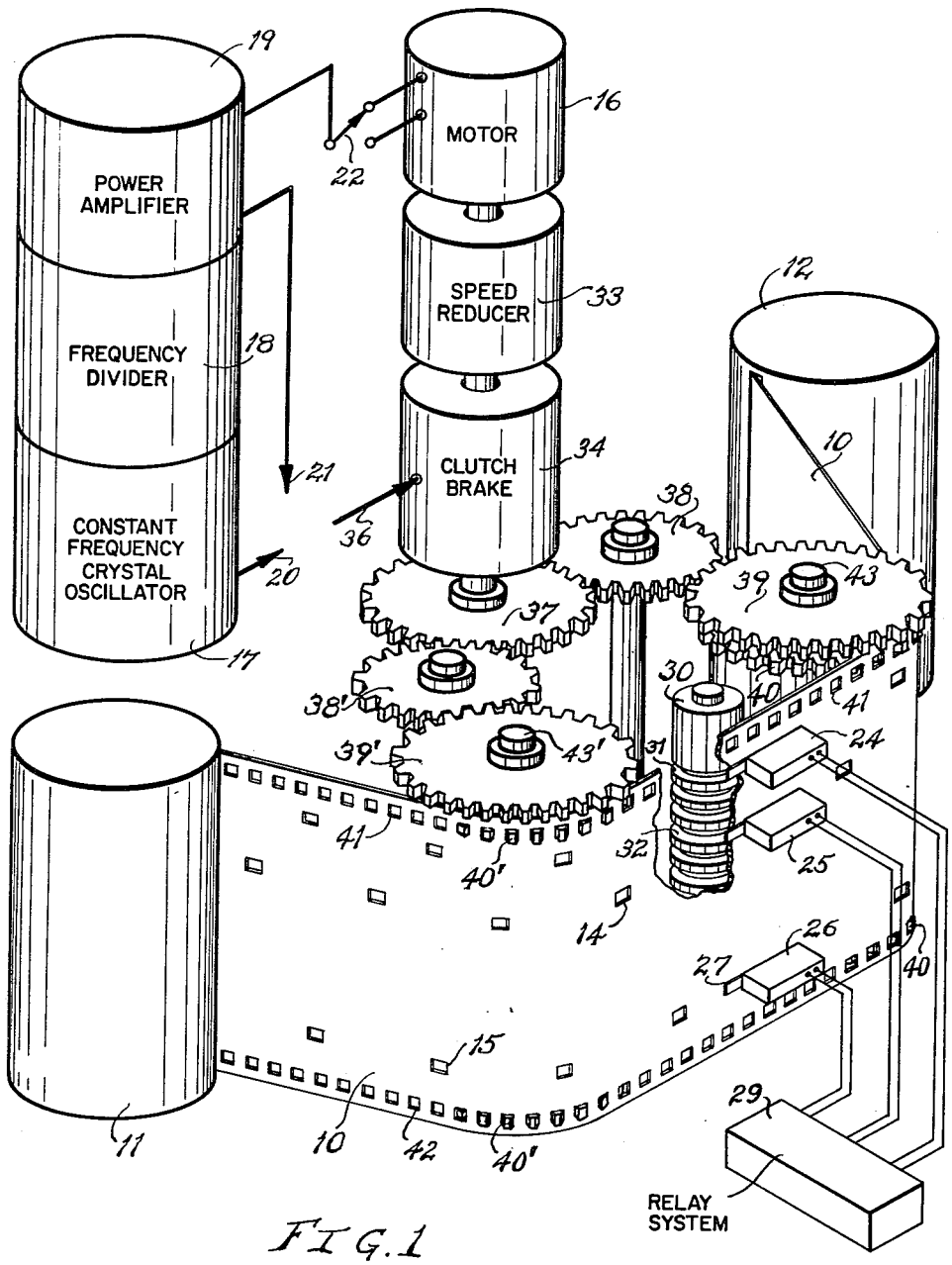

Referring now more particularly to FIG. 1 of the drawings, there is shown a program timing device which includes a self-winding tape 10 having stored thereon program timing information. As used in this specification, the term "self-winding tape" is intended to mean a tape, such as metal or plastic, which can be given a permanent set so that when the tape is unrestricted, it tends to wind itself into a coil of close or tight turns and in a cylindrical configuration.

In the device of FIG. 1, the tape 10 is thus first wound upon and fed from a free-running spool or reel in a cylinder 11 to a free-running spool in a cylinder 12, in the period during which the program information stored on the tape is being derived from the tape in a manner which will be described in more detail hereinafter.

As above indicated, in the illustrated embodiment, the tape 10 has the program information stored thereon by means of a series of holes, two of which are designated by the numerals 14 and 15. The FIG. 1 arrangement includes a motor 16 for driving the tape 10. The motor 16 may be of a synchronous hysteresis type. In order to provide a driving voltage for the motor 16, there is provided in the FIG. 1 embodiment a constant frequency crystal oscillator 17, a frequency divider network 18, and a power amplifier 19. The crystal oscillator 17 may, for example, consist of an oscillator circuit which is crystal-controlled to operate at a frequency of 25.6 kilocycles, in a manner such that its frequency is inherently very stable. The crystal-controlled oscillator can be and, in the present embodiment, is capable of a frequency stability of better than plus or minus twenty parts per million from the established frequency over the temperature range of 0° C. to 60° C. This provides an accurate time base for the precise control of the timing intervals of the program which is stored upon the tape 10.

In order to provide a suitable low-frequency driving source for the motor 16, the frequency divider 18 is provided for reducing the high frequency of the oscillator 17 to suitable low driving frequency, such as 400 cycles per second. In such a case, the frequency divider 18 is made to reduce the frequency of the crystal-controlled oscillator 17 by a factor of 64:1. The power amplifiers 19 preferably are of the transistor type in order to provide a device which is sufficiently rugged and which is small and compact enough for the intended purpose.

A suitable D.C. power supply (not shown) provides a D.C. operating voltage for the oscillator or frequency divider 18 through the terminal 20, while a D.C. operating voltage is provided for the amplifier 19 through a terminal 21. The A.C. output from amplifier 19 is applied to the motor 16 through a suitable single-pole, double-throw switch 22, it being understood that when the switch is in the position shown, the motor will run in one direction, and when it is in its other position, the motor will run in the opposite direction.

The system, as shown in FIG. 1, also illustrates an output means for deriving program timing information from the tape 10. This includes a series of microswitches, three of which are shown and designated by the reference numerals 24, 25 and 26. It will be understood that as many as dozen or more such microswitches can be laterally displaced in a transverse zone across the tape 10, and that each longitudinal series of holes, across the width of the tape, can be used to control one of the microswitches. Thus, the hole 14 is included in a series of holes which provide a control for microswitch 25, and the hole 15 is included in a series of holes which controls the microswitch 26. These microswitches are connected, as indicated in FIG. 1, to a relay system 29.

Each of the microswitches 24, 25, and 26, etc., includes a switch arm for operating the microswitch involved in cooperation with one of the holes in tape 10. Thus, the switch arm for microswitch 26 is designated by the reference numeral 27, and it will be understood that when one of the holes in the longitudinal line of holes which includes hole 15 is driven past the microswitch 26, the switch arm 27, which is biased toward the tape, is actuated to effect a control function.

The device of FIG. 1 includes a backing roller or drum 30 behind the tape and across the width thereof at a point at which the microswitches 24, 25, 26, etc., are operative. This roller 30 is journaled for free running, as appears in FIG. 2, and may have a series of grooves formed in its surface, two of which are designated by the reference numerals 31 and 32. The construction of the switch arms and the grooves and the location of the same are such that an element at the end of the arm of a microswitch can move into the hole in the tape 14, and the resulting movement of the arm causes an operation of the switch to which the arm is connected.

As indicated, the tape is engaged at either side of the zone of the microswitches, and of the back-up roller 30, for the driving and tensioning of the tape through sprocket teeth and gearing arrangement which appears particularly in FIG. 1. As there shown, the motor 16 is connected by a speed reducer 33, which is so designed as to reduce a relatively high speed of rotation of the motor to a low speed. For example, the motor may operate at 8000 r.p.m., and the delivery shaft of the speed reducer may rotate at a speed of 5 r.p.m.

The output shaft of the speed reducer may be connected to a magnetic clutch brake device 34, so arranged that when a voltage is applied to an input terminal 36, a brake is released and the driving gear 37 is thereupon drivingly connected to the output shaft of the speed reducer, and thus rotates a gear 37 at the desired reduced speed. When the clutch brake 34 is de-energized by discontinuing the application of voltage to the terminal 36, the clutch is disengaged, and the brake is applied so that the gear 37 comes to an immediate stop.

The driving connection between the slow speed output gear 37 and the tape includes a pair of gears 38 and 38', which in turn mesh with gears 39 and 39', rigid on shafts 43 and 43', and on which are mounted the sprocket wheels having teeth 40 and 40' engaging the driving openings 41 and 42 uniformly longitudinally spaced at the margins of the tape.

The driving gear 37, the idlers 38 and 38', and driven gears 39 and 39', are formed with accuracy and precision, and when in constant mesh, they are so designed and fitted as to prevent any back-lash when driving in either direction. The sprockets have their teeth 40 and 40' so shaped and so related to the spacing of the openings 41 and 42, that when the tape is in the driving position shown in FIG. 1, a constant tension on the tape, between the pairs of sprocket wheels and their teeth engaging the driving openings, prevents lateral vibration or lost motion or any irregular movement of the tape, as it is being progressed during the timing operation.

Thus, it will be seen that when the tape is being driven to the right in FIG. 1 for programming operation, the pull on the tape may be primarily effected by the sprocket teeth 40 on the shaft 43, continuously, accurately, and precisely driven by the gear 39, idler 38, and driving gear 37. At the same time the synchronized and following rotation of the sprockets 40' may assure drawing the tape from its storage coil spool in the casing 11, while effecting tension on the tape between the teeth of the sprockets 40' and 40. The tape passing away from the sprockets 40 is, by its own self-supporting stiffness and tendency to coil, passing into a suitable slotted opening in the casing 12, where it winds itself on a freely rotating spool, not shown. Obviously, driving in reverse direction is effected precisely in the same manner, while maintaining the desired tension and uniformity of speed of movement of the tape.

Figure 2:
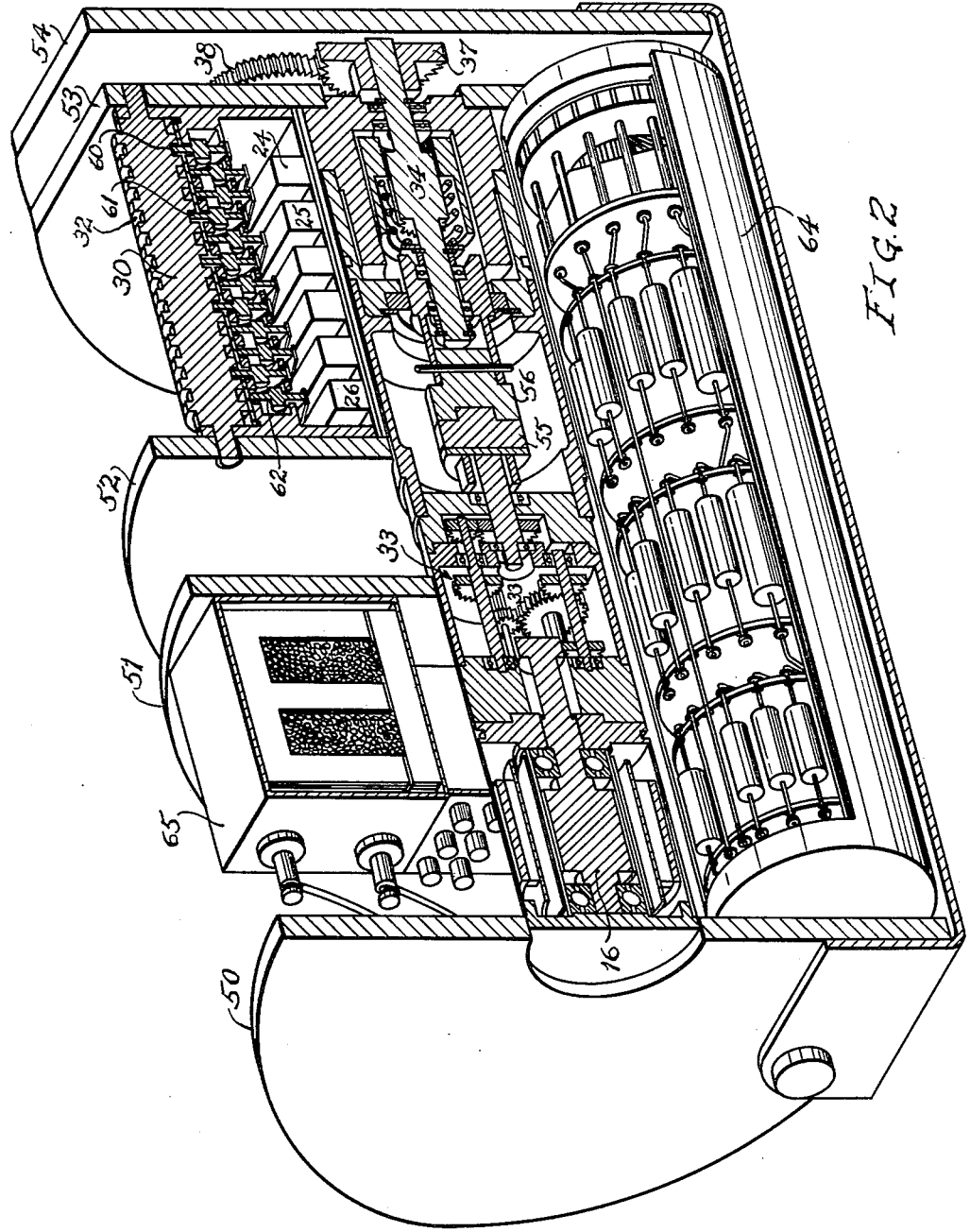
FIG. 2 is a sectional perspective view of a program timing device similar to the FIG. 1 embodiment but having a specific physical construction.
Figure 3:
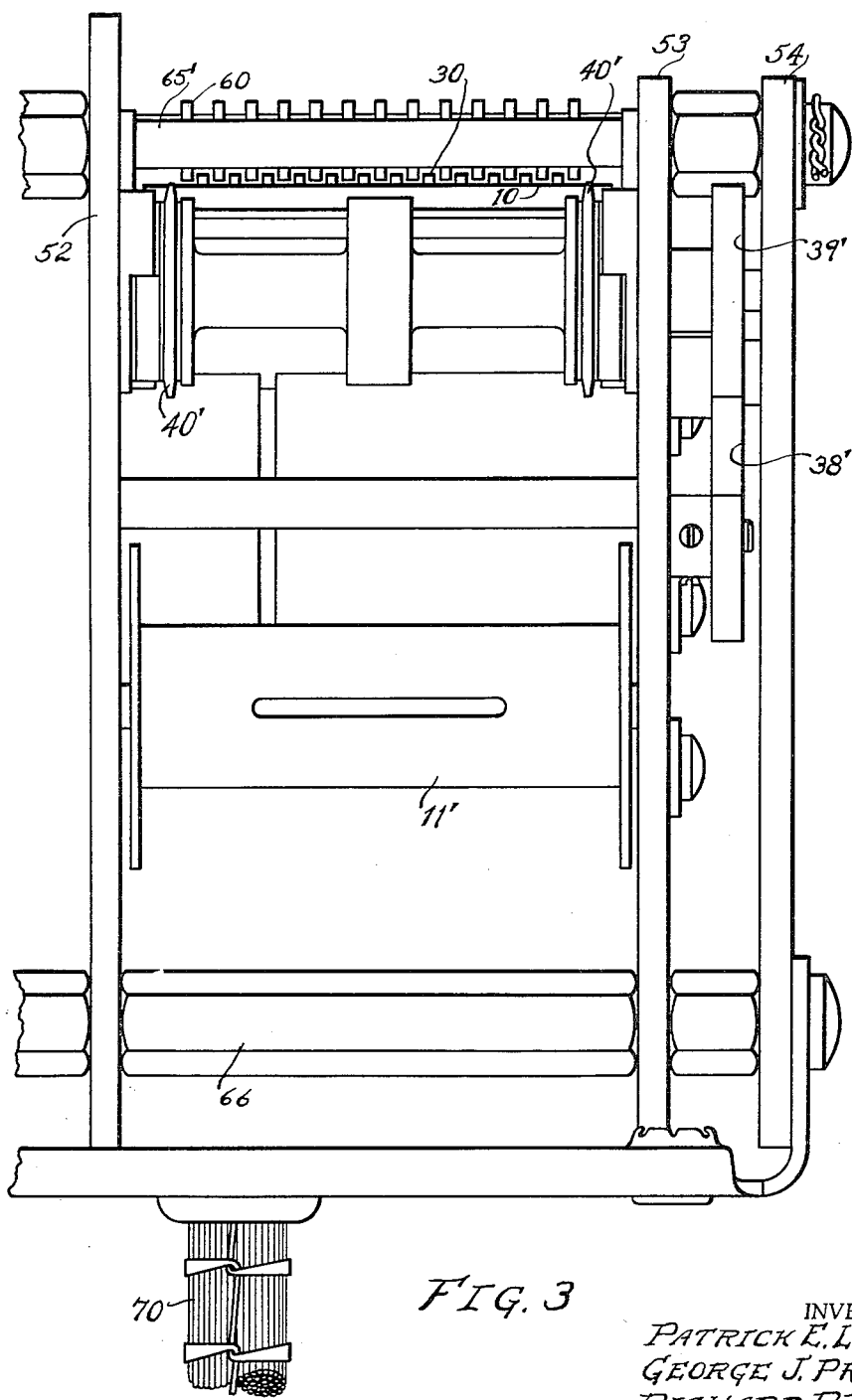
FIG. 3 shows a portion of the FIG. 2 device.
Figure 4:
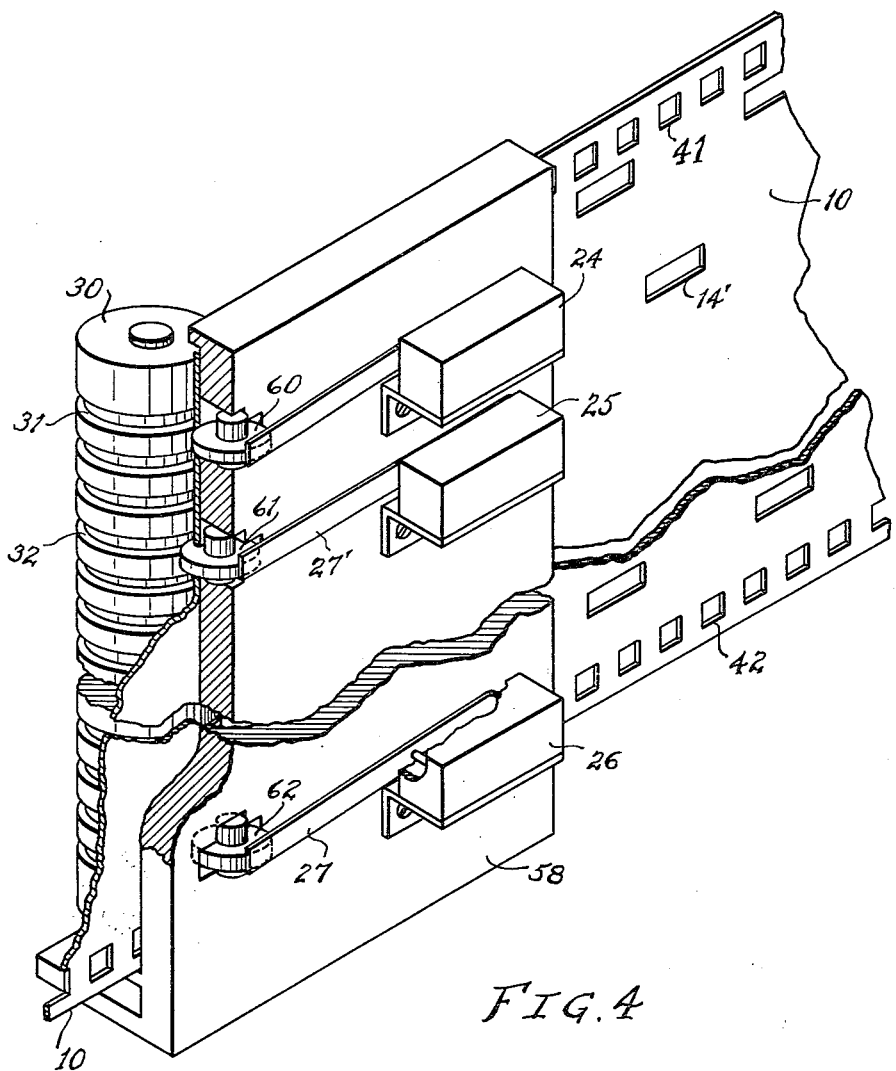
FIG. 4 shows details of the output means coacting with the tape for deriving program information.

A more detailed illustration of the form of the program timing device, which has been described in connection with FIG. 1, is further illustrated by FIGS. 2, 3 and 4 of the drawings. Elements which are similar in the various drawings have been given identical reference numerals. Referring now more specifically to FIGS. 2, 3, and 4 of the drawings, the program timing device as there illustrated was designed to be incorporated into the cylindrical hull of a satellite launching rocket. The assembled structure includes a number of circular metal spacers designated by the reference numerals 50, 51, 52, 53, and 54, respectively. These spacers very simply provide rigid mounting platforms for the apparatus to be included in the timing device. Only three of the spacers 52, 53, and 54 are shown in the FIG. 3 arrangement, and it will be understood that some portions of the circumference have been flattened, which accounts for the apparent difference in size of the plates of 53 and 54 from the plate 52 in the FIG. 3.

The illustration of FIG. 2 is a perspective view, the plane of the section being through the motor, speed reducer, clutch-brake and backing roller for the tape. Thus, in FIG. 2, the motor is again designated by the reference number 16, and is illustrated as of ball-bearing construction, having one end plate carried by the spacer member 50. The speed reducer 33 is shown in the FIG. 2 embodiment as a gear cluster which is connected through a connecting device 55, 56 to a clutch brake mechanism 34.

The clutch brake mechanism includes a spring-biased member which is moved when voltage is applied to the electrical terminal thereof (not shown) to cause the drive gear 37 to be connected to the speed reducer 33 through the coupling device 55, 56. At the right the driving gear 37 is shown as meshing with one of the idler gears 38.

The details of the microswitch operating mechanism are shown most clearly in FIG. 4. Here the tape is again designated by the reference numeral 10, and three microswitches are shown which are designated 24, 25, and 26 to correspond to those illustrated in FIG. 1. A mounting bracket 58 is shown in FIG. 4, and microswitch units 24, 25, and 26 are mounted thereon so that their switch arms are adjacent the proper holes in the tape 10 as these holes are driven past the output means. Switch arm 27 of switch is so designated to correspond to the designation used in FIG. 1.

The element at the end of each switch arm, which coacts with the tape and which moves when a timing opening or hole in the tape registers therewith, may be a small radially shiftable roller in the nature of a disk having trunnions rotatable and slidable in recesses in the switch mounting plate 58. Such disk rollers are illustrated at 60, 61, and 62 in FIG. 4. The tape opening, designated 14', is illustrative of the elongated form, and it will be seen that when such an opening comes under a roller as at 61, the roller is moved partially through the opening and into a corresponding groove as at 32, in the roller 30; whereupon, the corresponding movement of the switch arm 27' would actuate the microswitch 25. Obviously, when the rollers are riding upon the inner face of the tape 10, their corresponding microswitches are idle.

It is to be understood that the mechanical construction of the elements coacting with the tape for operating the microswitches may be varied, it being most desirable, however, to attain accuracy and certainty of response to the spaced marking means on the tape.

In the embodiment of the invention under consideration here, twelve grooves such as 31 and 32 have been provided in the roller 30, and it will be understood that there are normally provided a corresponding number of microswitches 24, 25, 26, etc., one for cooperation with each groove of the roller 30, and correspondingly, each series of longitudinal timing openings 14 in tape 10.

In the embodiment of the invention under consideration, some of the microswitches are mounted to the right of the roller 30, as illustrated in the case of switches 24, 25, and 26, while others (not shown) are mounted to the left of this roller 30.

The crystal oscillator, the frequency divider network, and the power amplifier illustrated in the FIG. 1 embodiment are included in FIG. 2 in the container designated by the reference numeral 64. Numerous electrical components, such as resistors and capacitors, associated with these devices are also illustrated in FIG. 2.

There is also illustrated in FIG. 2 a transformer 65 adapted to be connected between the power amplifier of the driving source and the motor 16. This transformer is not shown in FIG. 1 of the drawing. One of the free-running tape reels, specifically reel 11, is shown in FIG. 3. Here, also, the gears 38' and 39' are indicated, with the sprocket teeth 40' engaging the tape 10, shown by a single line extending along the roller 30.

It will be understood that suitable tie rods are provided between the spacers or plates in the embodiment illustrated in FIGS. 2, 3, and 4. The tie rods shown in FIG. 3 are designated by the reference numerals 65' and 66.

It will also be understood that the microswitches 24, 25, 26, etc., are used to operate a plurality of relays (not shown) and that the operating contacts of these relays may be included in the circuits of the various devices to be controlled by the program timer. In the specific case illustrated, the relay system comprised twelve microswitches and seventeen hermetically sealed sub-miniature type relays with double-pole, double-throw contacts. Of the seventeen relays, ten operate to open and close various external circuits in conformance with an accurate timing schedule; five operate as holding relays; one functions as a motor control, and one operates as a coding relay.

In considering the operation of the embodiment of the invention illustrated in FIGS. 2, 3, and 4, it will be seen that the programming tape 10 can be inserted in the program timer in much the same way that a camera is loaded. One end of the tape is thus inserted through the slot of the storage spool in the casing 11 on which the greater part of the length of the tape coils itself. Now the free end portion of the tape may be fitted onto the driving sprockets and be started to coil upon the take-up spool at 12. When the tape is first placed in position, all of the microswitches 24, 25, 26, etc. are in a depressed position. The tape is advanced to the "time zero" position by rotating the take-up spool until the proper actuating wheel engages the first punched hole in the tape.

When 24 volts D.C. is applied to the program timer from an external source, the 400-cycle per second generator immediately commences operation, and the driving speed of 5 r.p.m. is available at the output of speed reducer 33.

Upon closure of the start time switch to launch the rocket, the clutch 34 is energized, and the resultant movement of the tape begins the timing sequence. As the tape progresses from the loading spool 11 to the take-up spool 12, any given microswitch (24, 25, 26, etc.) is maintained in the depressed position so long as its actuator wheel rides along the surface of the tape. When the continuity of the tape is interrupted by a punched hole in the tape, the contact arm of the microswitch forces the corresponding tape-tracing element (i.e., the roller disk) partially through the hole into one of the grooves in the guide roller 30. This results in the operation of the connected microswitch, which in turn completes a circuit for energizing the corresponding relay. As the linear motion of the tape continues, it pushes the roller-disk outwardly against the tension of the leaf spring of the microswitch, thereby restoring the microswitch to its original depressed position.

It has been found possible with this invention to control a taped programming of 720 seconds with an accuracy of plus or minus one-tenth of a second after the "time zero" for a given circuit to be energized or de-energized. After the 720-second period, the tape automatically stops the timing sequence is concluded.

For testing and experimental purposes, provision has been made for bringing the tape back to the "time zero" position by electrically reversing the motor. This is done, for example, by movement of the switch arm 22 in the FIG. 1 embodiment to its other position. The motor 16 then runs in the opposite direction and it is de-energized by the action of the first hole in the tape 10.

The tape utilized in the arrangement illustrated comprised a precoiled stainless steel strip having a length of 154 inches, a width of 1.875 inches, a thickness of 0.002 inch. The overall weight of the device illustrated was less than six pounds.

The present disclosure does not include the D.C. power source, and it will be understood that suitable operating voltages are applied to the device from external sources (not shown) and that the relay circuits involved are completed through the series of wires 70 brought out from the device, as appears in FIG. 3.

The device herein illustrated and described was found to withstand vibrations for the time periods, the frequencies and acceleration specified as follows:

| Frequency, c.p.s. | Acceleration | Linear Sweep Rate (c.p.s./sec.) | Time, Minutes |
| --- | --- | --- | --- |
| 0-35 | 0.030 in. dbl. ampl | 0.04 | 20 |
| 30-100 | 2.0 g | 0.15 | 16 |
| 80-350 | 3.5 g | 0.30 | 24 |
| 300-2,000 | 6.0 g | 1.9 | 30 |

While there have been described what are presently considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

From the foregoing description it will be apparent that a specific object of the invention is to maintain tension upon the effective reach of the tape extending across the output means or zone of responsive controlling elements without a friction drag on the feeding side of the tape, and while positively drawing the tape from its self-coiled position on the storage reel.

The provision of non-friction elements yieldingly engaging the surface of the tape and subject to movement for actuating microswitches of the output means upon engagement with the mechanical element for effecting a control impulse, is also a valuable feature.

It will also be apparent that the accurately fitted gearing connected to the same drive gear, and comprising driving and tensioning means, including the idlers and synchronized driven gears and sprocket teeth, coacting with precise spacing of the drive openings in the tape, will maintain the desired tension, freedom from surface vibration and effect precise timing of the advance of the tape, with a minimum use of power.

The self-contained power source including the constant frequency crystal oscillator, dividing network, power amplifier and the mechanical driving means, and including the motor speed reducer and clutch brake, is efficient and light weight. The yieldingly actuated non-friction means engaging the surface of the tape, and in each case normally holding its microswitch in idle position, constituting the small rollers capable of moving a short distance into the elongated opening in the tape, constitutes a simple, effective and positive free-running device which attains high accuracy and further contributes to permitting the use of such a very light weight power source.

Having thus described our invention, what we claim is:

1. A program timing device comprising: a self-winding tape having a permanently set property tending to coil closely upon itself and having stored thereon program timing information, a motor for driving said tape, output means for deriving said program timing information from said tape, driving means connected with the motor and engaging the tape at positions displaced along the tape from each side of the output means for moving the tape from one self-coiled storage roll to a self-coiling receiving roll.

2. A program timing device comprising: a self-winding thin spring metal tape pre-set to wind itself into a coil and having stored thereon program timing information, a motor for driving said tape, output means for deriving said program timing information from said tape, synchronized driving connections between the motor and the tape including a tape-engaging means displaced along the tape at each side of said output means, said tape engaging means acting to exert a constant tension on the intervening reach of said tape.

3. A program timing device comprising: a tape having a permanent set which tends to effect self-coiling upon itself throughout its length and whereby it may coil at either end when moved longitudinally in either direction, a motor and guiding and driving means for the tape including means engaging the tape at longitudinally separated points and each mechanically positively connected to the motor, said driving means being synchronous and so engaging the tape as to maintain a tension thereon between the two engaging positions, program timing information mechanically stored on the tape, output means located between the driving means and responding to said information for effecting output-impulses as the tape is moved in either direction, and means for holding one self-coiled storage roll and means for holding a self-coiling receiving roll positioned respectively at each side of the driving and output means.

4. A program timing device comprising: a tape of thin spring metal having inherent permanent set so that when unrestricted it tends to wind itself into a coil of close turns and having stored thereon program timing information, a constant speed motor for driving said tape, output means for deriving said program timing information from said tape, a first drive means displaced along said tape from said output means and coupling said tape to said motor for driving said tape in a given direction, a second drive means displaced along said tape from said output means in the opposite direction with relation to the output means and from said first drive means and coupling said tape to said motor for driving said tape in said given direction, and a free-running support for a self-coiled storage roll and a free-running support for a self-coiled receiving roll, said supports being positioned at each side of the drive means and output means.

5. A program timing device comprising: a thin tape having an inherent permanent set so that when unrestricted it tends to wind itself into a close coil and having stored thereon program timing information, a synchronous motor for driving said tape, a crystal-controlled source of supply for said motor for supplying thereto a voltage of a substantially constant frequency to drive said motor at a substantially constant speed, output means for deriving said program timing information from said tape as it is moved longitudinally, a pair of tape-engaging driving means connected with the motor and positioned one at each side of said output means for moving said tape longitudinally from a self-wound coil at one end toward a self-coiling position at the other end, said driving means positively engaging the tape and effecting a tension on the tape at the reach extending across the output means.

6. A program timing device comprising: a thin flexible tape having a permanent set property of coiling upon itself and having timing information thereon, in the form of longitudinally channeled transversely spaced actuators, a reversible motor for driving said tape, a relay having switch contacts, output means for deriving said program timing information from a single channel of actuators on said tape to open and close the contacts of said relay in a predetermined timing sequence, a first drive means displaced along said tape from said output means and coupling said tape to said motor for driving said tape, and a second drive means displaced along said tape from said output means in the opposite direction from said first drive means relative to the output means and coupling said tape to said motor, both said drive means so engaging the tape as to prevent lost motion and exerting a constant tension on the reach of tape between them, when driving in either direction.

7. A program timing device comprising: a tape of a material present to coil closely upon itself and having holes therein which are spaced along the tape to provide program timing information, a motor for driving said tape, a relay having circuit controlling contacts, output means comprising an element moved by said holes in said tape for deriving said program timing information from said tape to open and close the contacts of said relay in a sequence determined by the positioning of said holes for the information stored in said tape, a first and second drive means displaced along said tape from each way from said output means and each coupling said tape to said motor for driving said tape in a direction away from the output means, while pulling the tape in tension against the opposite driving means.

8. A program timing device comprising: a tape of thin material having an inherent preset property tending to curve it to coil upon itself and having holes therein which are spaced along the tape to provide program timing information, a motor for driving said tape, a relay having circuit controlling contacts, output means comprising a wheel moved by registration with said holes in said tape for deriving said program timing information from said tape and effective upon movements of said wheel to open and close the contacts of said relay in a sequence determined by the information stored in said tape, a drive means positioned along said tape at each side of said output means and each mechanically coupling said tape to said motor for pulling said tape in the direction toward the drive means and away from said output means, said drive means being positively interconnected and having positive engagement with the tape and arranged to maintain tension thereon between the drive means.

9. A program timing device comprising: a tape of resilient material having a preset condition to cause the tape when unrestricted to coil closely upon itself and having holes therein which are spaced along the tape to provide program timing information, a motor for driving said tape, a relay including circuit controlling contacts, output means comprising a wheel movable to project a segment thereof into said holes in said tape for deriving said program timing information from said tape by causing movements of said wheel, means connected with the wheel and effective to open and close the contacts of said relay in a sequence determined by the positioning of the holes for the information stored in said tape, a roller on the opposite side of said tape and backing said tape adjacent the point at which said wheel contacts said tape, longitudinally separated and tape-engaging driving means at opposite sides of the output means and said roller, and being connected with the motor for synchronous driving action on the tape in either direction.

10. A program timing device comprising in combination a thin resilient tape of a material having a preset condition tending to curl the tape and cause it to coil closely upon itself when unrestricted and having holes therein which are spaced along the tape to provide program timing information, a motor for driving said tape, a relay including circuit controlling contacts, output means comprising a wheel moved by said holes in said tape for deriving said program timing information from said tape and effective upon movements of said wheel to open and close the contacts of said relay in a sequency determined by the positioning of the holes in said tape, a grooved roller on the opposite side of said tape and backing said tape adjacent the point at which said wheel contacts said tape, a groove in said roller being adapted to receive a portion of said wheel when projecting through one of said holes in said tape, and mutually synchronous mechanical driving means engaging the tape at each side of the output means and said roller and being connected with the motor for driving in either direction while exerting a constant tension on the tape between the driving means engaging the tape at each side of the output means.

11. A program timing device comprising: a self-winding tape having a pre-set property tending to tightly coil the tape upon itself and having driving sprocket holes arranged longitudinally thereof and program timing mechanical indicia positioned along the tape, output means for coacting with said indicia for effecting programmed impulses, the motor for driving the tape, sprocket wheels spaced longitudinally each way from the output means and having teeth engaging the driving sprocket holes in the tape, mechanical driving connections between the motor and the sprocket wheels for synchronously rotating the same simultaneously in either direction, the shaping and positioning of the sprocket wheels and teeth thereon being such that the teeth of each sprocket engage the driving sprocket holes tightly at the sides of the holes remote from said output means.

12. The device defined in claim 11 in which the motor is connected with the sprocket wheels through a drive gear on the motor, a gear rigid with the motor, a gear rigid with each sprocket, and an idler between each sprocket and the motor gear.

13. The device defined in claim 11 in which the tape is provided with sprocket teeth receiving openings at each margin and arranged longitudinally along the same, and in which the sprocket teeth are rigid with a coaxial gear, and in which last-named each sprocket gear is geared to the motor gear.

References Cited in the file of this patent

UNITED STATES PATENTS

| | | |
|---|---|---|
| 1,202,952 | Adams | Oct. 31, 1916 |
| 2,475,307 | Brand | July 5, 1949 |
| 2,585,573 | Moore | Feb. 12, 1952 |
| 2,656,109 | Lindars | Oct. 20, 1953 |
| 2,711,790 | Lorenz | June 28, 1955 |
| 2,806,096 | Christopher | Sept. 10, 1957 |
| 2,860,199 | James et al. | Nov. 11, 1958 |
| 2,948,881 | Berti et al. | Aug. 9, 1960 |